(12) United States Patent
Yoshitomi

(10) Patent No.: US 11,502,324 B2
(45) Date of Patent: Nov. 15, 2022

(54) FUEL CELL MODULE AND METHOD OF MOUNTING THE FUEL CELL MODULE

(71) Applicant: HONDA MOTOR CO., LTD., Tokyo (JP)

(72) Inventor: Ryoichi Yoshitomi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 427 days.

(21) Appl. No.: 16/571,313

(22) Filed: Sep. 16, 2019

(65) Prior Publication Data

US 2020/0091541 A1 Mar. 19, 2020

(30) Foreign Application Priority Data

Sep. 19, 2018 (JP) .............................. JP2018-174837

(51) Int. Cl.
*H01M 8/2475* (2016.01)
*B60R 16/033* (2006.01)

(52) U.S. Cl.
CPC ......... *H01M 8/2475* (2013.01); *B60R 16/033* (2013.01); *B60Y 2400/202* (2013.01); *H01M 2250/20* (2013.01)

(58) Field of Classification Search
CPC ........... H01M 8/2475; H01M 2250/20; H01M 2008/1095; H01M 8/242; B60R 16/033; B60Y 2400/202; B60L 50/72; Y02E 60/50; Y02T 10/70; Y02T 10/7072; Y02T 90/14; Y02T 90/40; B60K 1/00
See application file for complete search history.

(56) References Cited

U.S. PATENT DOCUMENTS

2002/0187386 A1\* 12/2002 Sugiura ............... H01M 8/0254
429/470
2010/0147608 A1 6/2010 Okabe
(Continued)

FOREIGN PATENT DOCUMENTS

JP 2007-073375 3/2007
JP 2007-141553 6/2007
(Continued)

OTHER PUBLICATIONS

Japanese Office Action for Japanese Patent Application No. 2018-174837 dated Jan. 5, 2022.

*Primary Examiner* — Muhammad S Siddiquee
(74) *Attorney, Agent, or Firm* — Amin, Turocy & Watson, LLP

(57) ABSTRACT

A fuel cell module includes a case body containing a cell stack body formed by stacking a plurality of power generation cells. The case body includes a plurality of connectors for mounting the fuel cell module into a fuel cell vehicle. The plurality of connectors include a first connector group used for mounting the fuel cell module into a first fuel cell vehicle in a manner that a stacking direction of the fuel cell module is substantially aligned with a first direction, and a second connector group used for mounting the fuel cell module into a second fuel cell vehicle in a manner that the stacking direction of the fuel cell module is substantially aligned with a second direction. Some connectors are common to both the first connector group and the second connector group.

4 Claims, 7 Drawing Sheets

(56) References Cited

U.S. PATENT DOCUMENTS

| | | | | |
|---|---|---|---|---|
| 2015/0197165 A1* | 7/2015 | Katano | .................... | B60K 1/04 |
| | | | | 429/470 |
| 2015/0251560 A1* | 9/2015 | Ishikawa | ................ | B62D 21/15 |
| | | | | 429/469 |
| 2016/0297290 A1 | 10/2016 | Murata et al. | | |
| 2019/0260061 A1* | 8/2019 | Hamada | .................. | B60L 50/71 |

FOREIGN PATENT DOCUMENTS

| JP | 2008-290470 | 12/2008 |
|---|---|---|
| JP | 2015-168308 | 9/2015 |
| JP | 2016-199142 | 12/2016 |
| JP | 2017-074934 | 4/2017 |

\* cited by examiner

FUEL CELL MODULE AND METHOD OF MOUNTING THE FUEL CELL MODULE

CROSS-REFERENCE TO RELATED APPLICATION

This application is based upon and claims the benefit of priority from Japanese Patent Application No. 2018-174837 filed on Sep. 19, 2018, the contents of which are incorporated herein by reference.

BACKGROUND OF THE INVENTION

Field of the Invention

The present invention relates to a fuel cell module which is mounted in a fuel cell vehicle, and a method of mounting the fuel cell module in the fuel cell vehicle.

Description of the Related Art

Conventionally, there has been a proposal for mount structure for mounting a fuel cell stack in a fuel cell vehicle. For example, according to the disclosure of Japanese Laid-Open Patent Publication No. 2015-168308, mount structure fixes a fuel cell module at three points (both side parts and a rear part) thereof by two side mounts provided on left and right side members of a vehicle body, and a rear mount provided on a cross member.

SUMMARY OF THE INVENTION

The mount structure in Japanese Laid-Open Patent Publication No. 2015-168308 relates to mounting of a fuel cell module including fuel cells stacked together in a vehicle width direction. However, even in the case of mounting the same fuel cell module, if the fuel cell module is mounted in different models of vehicles, it may be desirable to change the orientation of the fuel cell stack for mounting the fuel cell module.

It may be possible to consider attaching a plurality of connectors to a case body of a fuel cell module, for making the fuel cell module compatible with various types of mount structure. However, in view of achieving a desired strength against collision, connector parts of the case body need to be thick reinforced portions as reinforcement structure. If a large number of the thick reinforced portions are provided, the case body becomes large, and the fuel cell module becomes heavy disadvantageously.

An object of the present invention is to provide a fuel cell module and a method of mounting the fuel cell module in which it is possible to mount the fuel cell module in different orientations, and it is possible to suppress increase in the weight of a case body.

According to an aspect of the present invention, a fuel cell module is provided. The fuel cell module includes a cell stack body having a plurality of power generation cells stacked together, and a case body containing the cell stack body. The case body includes a plurality of connectors configured to mount the fuel cell module into a fuel cell vehicle. The plurality of connectors include a first connector group configured to be used for mounting the fuel cell module into a first fuel cell vehicle in a manner that a stacking direction of the cell stack body is aligned with a first direction, and a second connector group configured to be used for mounting the fuel cell module into a second fuel cell vehicle in a manner that the stacking direction of the cell stack body is aligned with a second direction. Some connectors are common to both the first connector group and the second connector group.

According to another aspect of the present invention, a method of mounting, into a fuel cell vehicle, a fuel cell module including a case body containing a cell stack body and a plurality of connectors provided on the case body, is provided. The connectors include a first connector group configured to be used for mounting the fuel cell module into a first fuel cell vehicle in a manner that a stacking direction of the cell stack body is oriented in a first direction, and a second connector group configured to be used for mounting the fuel cell module into a second fuel cell vehicle in a manner that the stacking direction of the cell stack body is oriented in a second direction. The method includes using, as common connectors, connectors that are common to both the first connector group for mounting the fuel cell module into the first fuel cell vehicle and the second connector group for mounting the fuel cell module into the second fuel cell vehicle.

According to the fuel cell module and the method of mounting the fuel cell module of the above aspects, in the fuel cell module including the first connector group used in the first fuel cell vehicle and the second connector group used in the second fuel cell vehicle, some of the connectors are used in common. In this manner, the number of connectors can be reduced, and the number of positions where the reinforced portions are formed is decreased. Accordingly, it is possible to suppress increase in the size and weight of the case body.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1A:
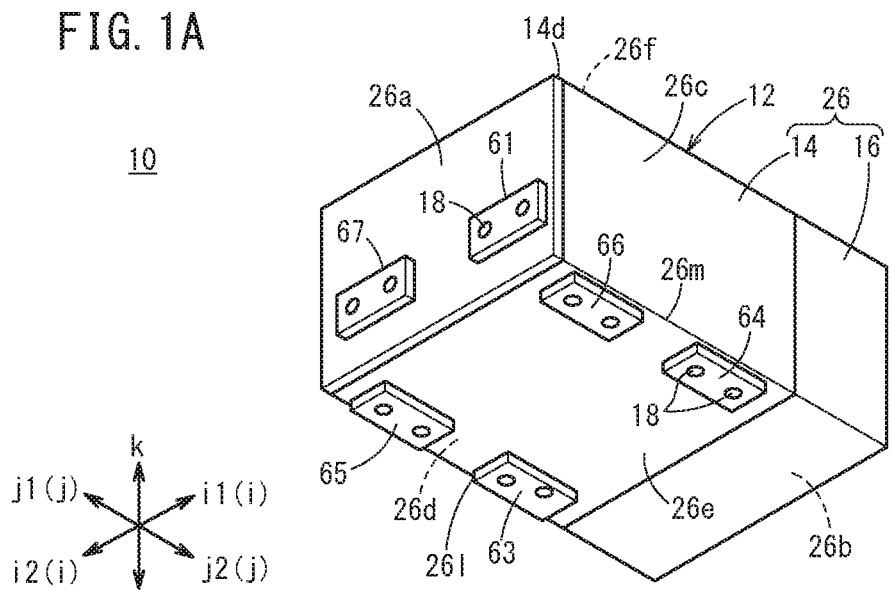
FIG. 1A is a perspective view showing a fuel cell module according to a first embodiment of the present invention, viewed from a first side surface.
Figure 1B:
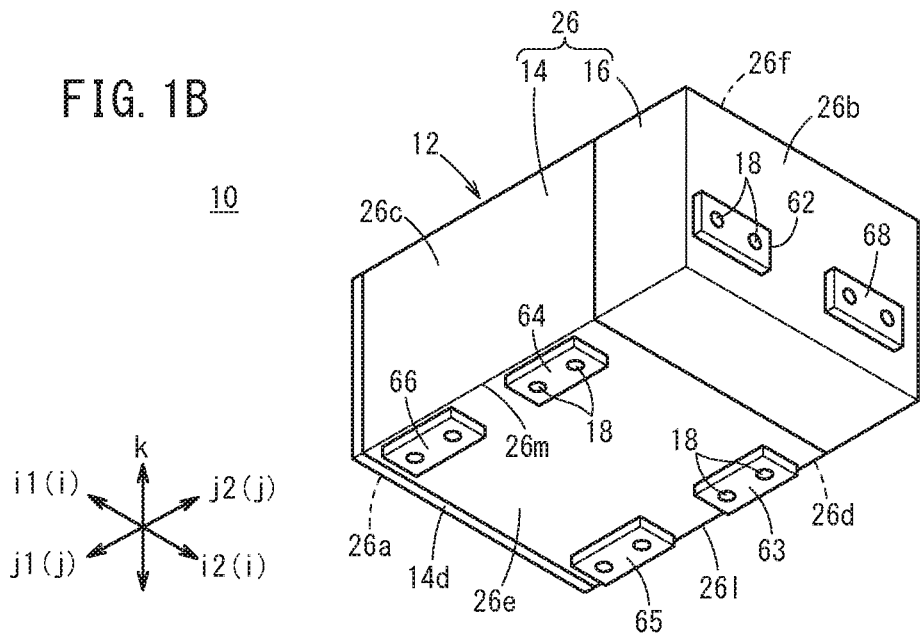
FIG. 1B is a perspective view showing the fuel cell module in FIG. 1A, viewed from a second side surface.

As shown in FIGS. 1A and 1B, a fuel cell module 10 according to an embodiment of the present invention includes a fuel cell stack 12, and an auxiliary device case 16 storing auxiliary devices of the fuel cell stack 12. For example, the fuel cell module 10 is a solid polymer electrolyte fuel cell. In the following description, the "above (upper part (upper side))" means the "above (upper part (upper side))" in the vertical direction, and the "below (lower part (lower side))" means the direction opposite to the "above (upper part (upper side))".

Figure 2:
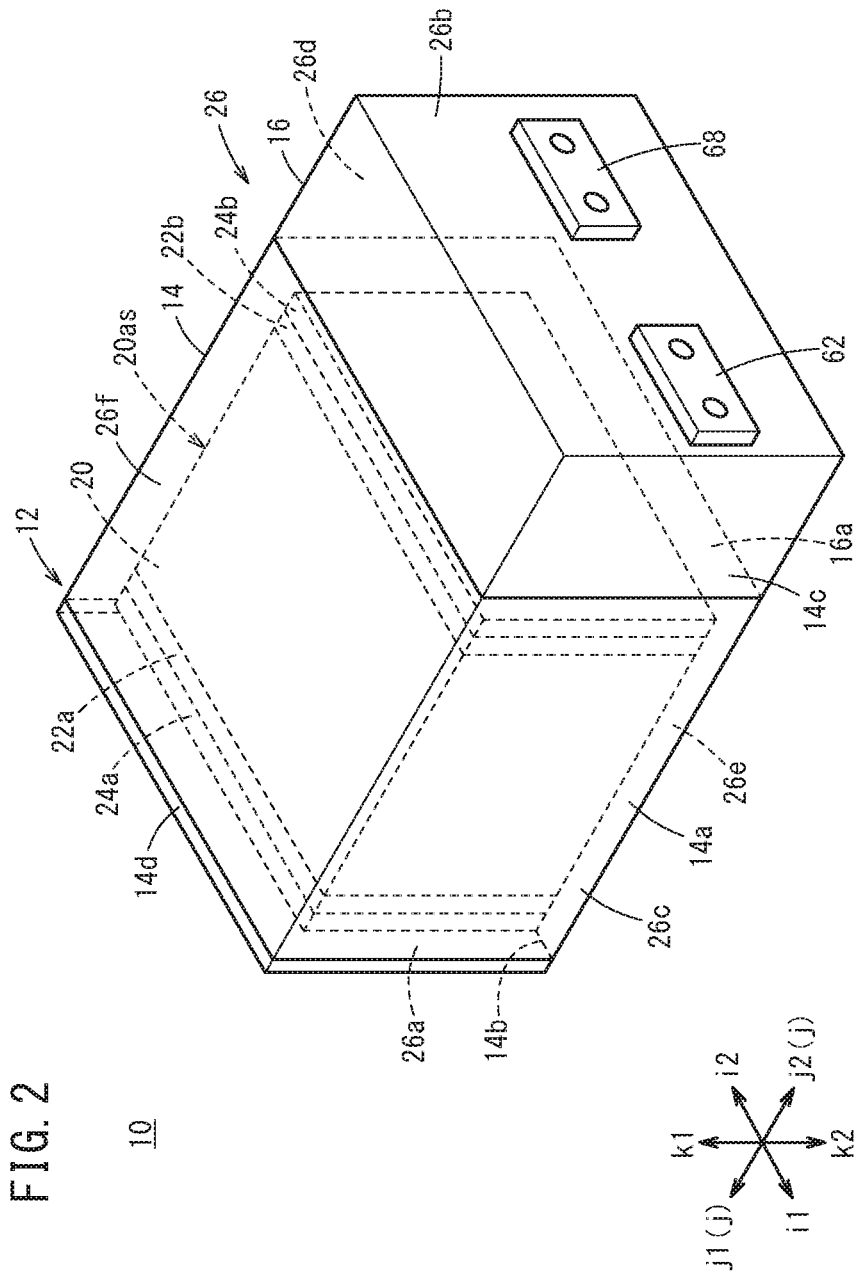
FIG. 2 is a perspective view showing a stacking direction of a cell stack body inside a case body of the fuel cell module in FIG. 1A.

As shown in FIG. 2, the fuel cell stack 12 includes a cell stack body 20as formed by stacking a plurality of power generation cells 20 in a direction indicated by an arrow j. At one end of the cell stack body 20as in a stacking direction (an end indicated by an arrow j1), a first terminal plate 22a and a first insulating plate 24a are provided in this order toward the outside. At the other end of the cell stack body 20as in the stacking direction (an end indicated by an arrow j2), a second terminal plate 22b and a second insulating plate 24b are provided in this order toward the outside. The fuel cell stack 12 is held between a side panel 14d of a stack case 14 and the auxiliary device case 16 through a spacer (not shown), and a tightening load in the stacking direction is applied to the fuel cell stack 12.

Figure 3:
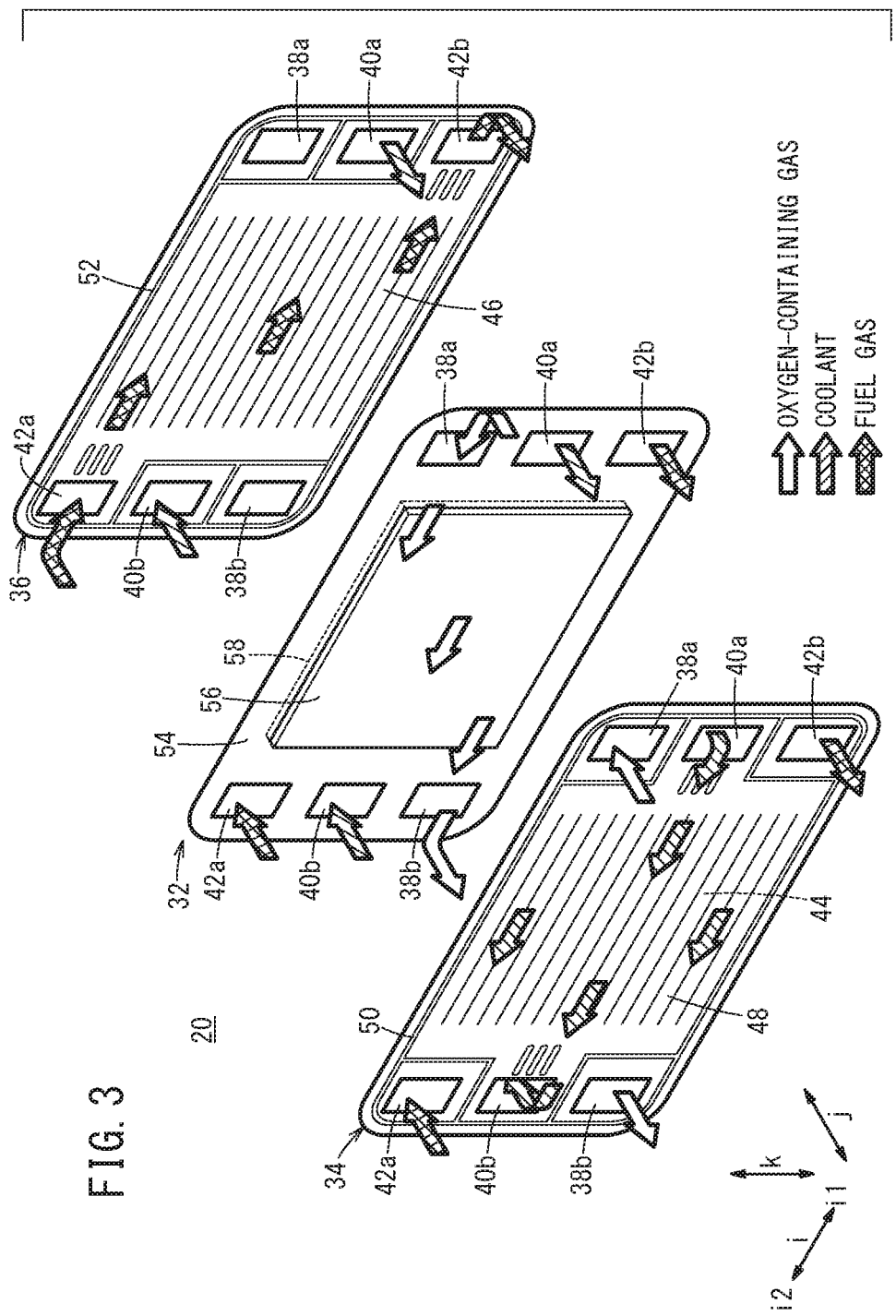
FIG. 3 is an exploded perspective view showing a power generation cell of the fuel cell module in FIG. 1A.

As shown in FIG. 3, a power generation cell 20 includes a membrane electrode assembly 32 and a first separator 34 and a second separator 36 sandwiching the membrane electrode assembly 32. Preferably, the four corners of the power generation cell 20 have a curved shape (R shape) (preferably, the power generation cell 20 has rounded corners.). The first separator 34 and the second separator 36 are metal separators or carbon separators.

At one end of the power generation cell 20 in a direction indicated by an arrow i1, an oxygen-containing gas supply passage 38a, a coolant supply passage 40a, and a fuel gas discharge passage 42b are arranged in a direction indicated by an arrow k (vertical direction). The oxygen-containing gas supply passage 38a, the coolant supply passage 40a, and the fuel gas discharge passage 42b extend through the power generation cell 20 in the stacking direction (indicated by the arrow j), respectively. An oxygen-containing gas is supplied through the oxygen-containing gas supply passage 38a, a coolant is supplied through the coolant supply passage 40a, and a fuel gas such as a hydrogen-containing gas is discharged through the fuel gas discharge passage 42b.

At the other end of the power generation cell 20 in a direction indicated by an arrow i2, a fuel gas supply passage 42a, a coolant discharge passage 40b, and an oxygen-containing gas discharge passage 38b are arranged in a direction indicated by an arrow k. The fuel gas supply passage 42a, the coolant discharge passage 40b, and the oxygen-containing gas discharge passage 38b extend through the power generation cell 20 in the direction indicated by the arrow j. The fuel gas is supplied through the fuel gas supply passage 42a, the coolant is discharged through the coolant discharge passage 40b, and the oxygen-containing gas is discharged through the oxygen-containing gas discharge passage 38b.

The first separator 34 has an oxygen-containing gas flow field 44 on its surface facing the membrane electrode assembly 32. The oxygen-containing gas flow field 44 is connected to the oxygen-containing gas supply passage 38a and the oxygen-containing gas discharge passage 38b. The oxygen-containing gas flow field 44 includes a plurality of straight grooves (or wavy grooves) for allowing the oxygen-containing gas to flow in the direction indicated by the arrow i2.

The second separator 36 has a fuel gas flow field 46 on its surface facing the membrane electrode assembly 32. The fuel gas flow field 46 is connected to the fuel gas supply passage 42a and the fuel gas discharge passage 42b. The fuel gas flow field 46 includes a plurality of straight grooves (or wavy grooves) for allowing the fuel gas to flow in the direction indicated by the arrow i.

A coolant flow field 48 is provided between the first separator 34 and the second separator 36 of the power generation cells 20 that are adjacent to each other. The coolant flow field 48 is connected to the coolant supply passage 40a and the coolant discharge passage 40b. The first separator 34 is provided with a seal member 50 integrally therewith or separately therefrom. The second separator 36 is provided with a seal member 52 integrally therewith or separately therefrom.

The membrane electrode assembly 32 includes a solid polymer electrolyte membrane (cation ion exchange membrane) 54, and a cathode 56 and an anode 58 which are provided on respective both sides of the solid polymer electrolyte membrane 54. For example, the solid polymer electrolyte membrane 54 is a thin membrane of perfluorosulfonic acid containing water. Each of the cathode 56 and the anode 58 includes a gas diffusion layer comprising a carbon paper, etc., and an electrode catalyst layer. The electrode catalyst layer is formed by porous carbon particles deposited uniformly on the surface of the gas diffusion layer and platinum alloy supported on the surfaces of the porous carbon particles. The electrode catalyst layers are formed on respective both surfaces of the solid polymer electrolyte membrane 54.

As shown in FIG. 2, the fuel cell module 10 includes the stack case 14 containing the cell stack body 20as. The stack case 14 includes a stack case body 14a having a rectangular shape in a plan view. The stack case body 14a includes a first opening 14b opened in the direction indicated by the arrow j1 and a second opening 14c opened in the direction indicated by the arrow j2, and has a box shape.

Further, the stack case 14 includes the side panel 14d which closes the first opening 14b of the stack case body 14a. The side panel 14d is a rectangular panel. The side panel 14d is joined to the first opening 14b of the stack case body 14a using bolts (not shown). A seal member (not shown) made of elastic material is provided between the stack case body 14a and the side panel 14d, over the entire periphery of joint surface joining the stack case body 14a and the side panel 14d.

The auxiliary device case 16 is a protection case for protecting the fuel cell auxiliary device, and the auxiliary device case is provided adjacent to the stack case 14 in the horizontal direction, and joined to the stack case 14. The auxiliary device case 16 includes a wall 16a joined to the stack case body 14a. The auxiliary device case 16 is joined to a left end of the stack case body 14a using bolts (not shown). A seal member (not shown) made of elastic material is provided between the stack case body 14a and the wall 16a of the auxiliary device case 16, over the entire periphery of joint surface joining the stack case body 14a and the auxiliary device case 16. A piping opening (not shown) is provided in the wall 16a of the auxiliary device case 16. A connection pipe for supplying an oxygen-containing gas or a hydrogen gas to the fuel cell stack 12 is inserted into the piping opening.

A case body 26 is made up of the stack case 14 and the auxiliary device case 16. The case body 26 has a substantially rectangular shape, when viewed in plan, having the long sides extending in the stacking direction (indicated by the arrow j) of the cell stack body 20as (see FIG. 2).

As shown in FIGS. 1A, 1B, and 2, the case body 26 includes a first side surface 26a and a second side surface 26b perpendicular to the stacking direction (indicated by the arrow j) of the cell stack body 20as, a third side surface 26c and a fourth side surface 26d in parallel with the stacking direction (indicated by the arrow j) of the cell stack body 20as, and a bottom surface 26e and an upper surface 26f. The first side surface 26a is formed by the side panel 14d of the stack case 14, and the second side surface 26b is formed by a surface of the auxiliary device case 16 that lies in the direction indicated by the arrow j2. The third side surface 26c is a side surface provided at one end in the direction indicated by the arrow i1, i.e., at an end of the power generation cell 20 where the oxygen-containing gas supply passage 38a is formed. Further, the fourth side surface 26d is a side surface provided at the other end in the direction indicated by the arrow i2, i.e., at an end of the power generation cell 20 where the oxygen-containing gas discharge passage 38b is formed.

The case body 26 has first to eighth connectors 61 to 68. As shown in FIG. 1A, the first connector 61 and the seventh connector 67 are formed on the first side surface 26a of the case body 26. The first connector 61 and the seventh connector 67 are spaced from each other in the direction indicated by the arrow i. Further, as shown in FIG. 1B, the second connector 62 and the eighth connector 68 are formed on the second side surface 26b. The second connector 62 and the eighth connector 68 are spaced from each other in the direction indicated by the arrow i.

Further, the third connector 63, the fourth connector 64, the fifth connector 65, and the sixth connector 66 are formed on the bottom surface 26e of the case body 26. Of these connectors, the third connector 63 and the fifth connector 65 are provided along the long side 26l of the case body 26 in the direction indicated by the arrow i2. Further, the fourth connector 64 and the sixth connector 66 are provided along the long side 26m in the direction indicated by the arrow i1.

It should be noted that the third connector 63, the fourth connector 64, the fifth connector 65, and the sixth connector 66 may be provided on the third side surface 26c and the fourth side surface 26d, instead of being provided on the bottom surface 26e of the case body 26. More specifically, the third connector 63 and the fifth connector 65 may be provided on the fourth side surface 26d adjacent to the long side 26l. Further, the fourth connector 64 and the sixth connector 66 may be provided on the third side surface 26c adjacent to the long side 26m.

Each of the first to eighth connectors 61 to 68 is a portion fixed to a vehicle body frame through a bracket described later, and in the form of a flat surface for connection of the bracket. Further, each of the first to eighth connectors 61 to 68 is a portion of the case body 26 reinforced by increasing the thickness of the case body 26, and has screw holes 18 for attaching the fixing bolts into the screw holes 18. For example, the number of the screw holes 18 formed in each connector may be two or three. The number of the screw holes 18 may be appropriately increased or decreased depending on the bracket. It should be noted that bosses may be provided instead of the screw holes 18.

A method of mounting the fuel cell module 10 having the above structure to a fuel cell vehicle will be described below.

Figure 4:
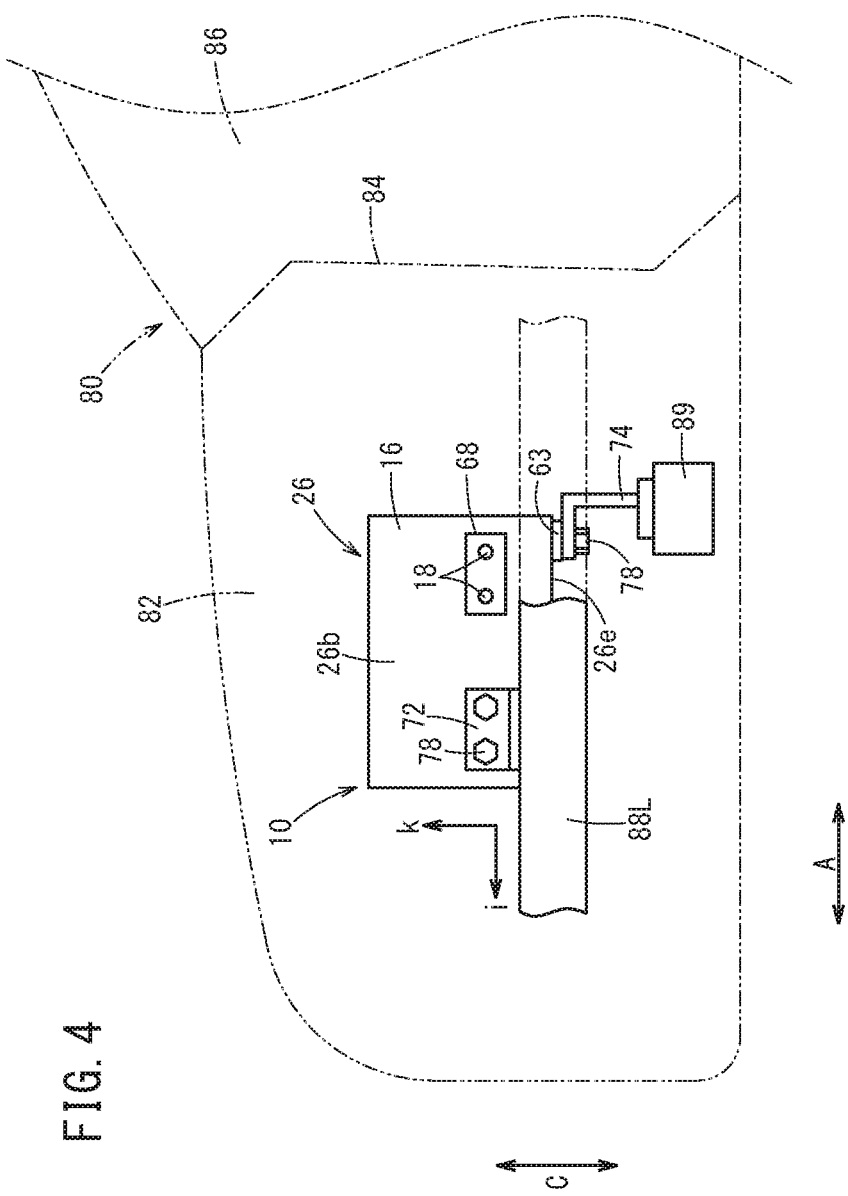
FIG. 4 is a side view showing a method of mounting the fuel cell module in FIG. 1A in a first fuel cell vehicle.

As shown in FIG. 4, in a first fuel cell vehicle 80, the fuel cell module 10 according to the embodiment of the present invention is mounted into the motor room (front box) 82. The motor room 82 is isolated from a vehicle compartment 86 by a dashboard 84.

Figure 5:
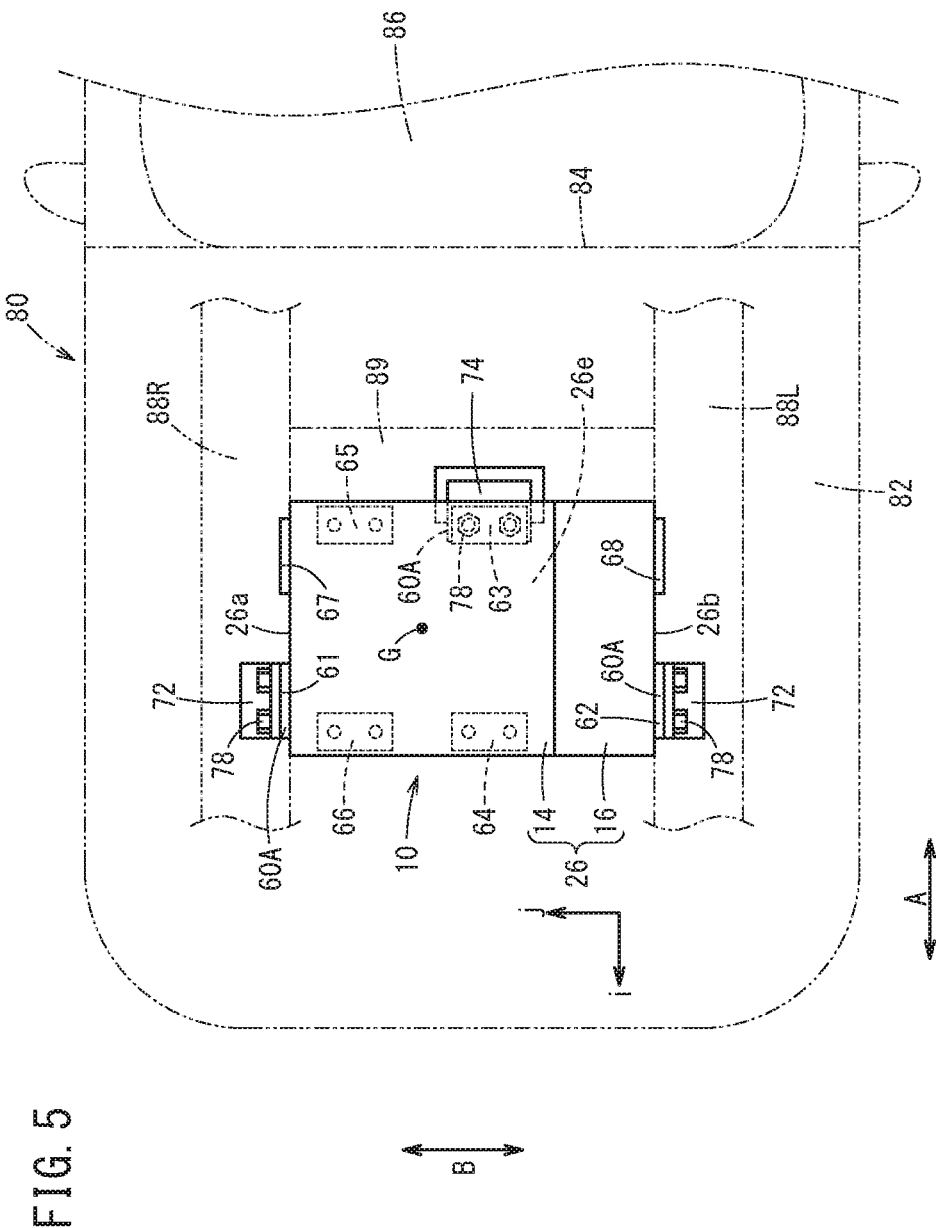
FIG. 5 is a plan view showing a method of mounting the fuel cell module in FIG. 1A in the first fuel cell vehicle.

As shown in FIG. 5, the motor room 82 includes a right side member 88R, a left side member 88L, and a cross member 89 of a vehicle body frame. The right side member 88R and the left side member 88L extend in a front-rear direction (indicated by the arrow A) of the first fuel cell vehicle 80. Further, the cross member 89 extends in a vehicle width direction (indicated by the arrow B) of the first fuel cell vehicle 80.

The fuel cell module 10 is mounted in the first fuel cell vehicle 80 such that the case body 26 is placed in a lateral direction in a manner that the stacking direction (indicated by the arrow j) of the cell stack body 20as is aligned with the vehicle width direction (indicated by the arrow B) of the first fuel cell vehicle 80. The fuel cell module 10 is fixed to the first fuel cell vehicle 80 at three points (i.e., the first connector 61, the second connector 62, and the third connector 63). That is, a first connector group 60A is formed by the first connector 61, the second connector 62, and the third connector 63.

The first connector 61 is a connector formed on the first side surface 26a of the case body 26 which is perpendicular to the stacking direction (indicated by the arrow j) of the cell stack body 20as, and the first connector 61 is fixed to the right side member 88R through a bracket 72. The bracket 72 and the first connector 61 are joined together using the bolts 78. Further, the second connector 62 is a connector formed on the second side surface 26b of the case body 26 which is perpendicular to the stacking direction (indicated by the arrow j) of the cell stack body 20as. The second connector 62 is fixed to the left side member 88L through a bracket 72. Further, the third connector 63 is a connector formed on the bottom surface 26e of the case body 26, and fixed to the cross member 89 through a bracket 74. Preferably, in order to reliably fix the fuel cell module 10 to the first fuel cell vehicle 80, the first connector 61, the second connector 62, and the third connector 63 of the first connector group 60A are selected such that the connectors are positioned so as to surround the gravity center G of the fuel cell module 10 in a plan view as shown in FIG. 5.

Figure 6:
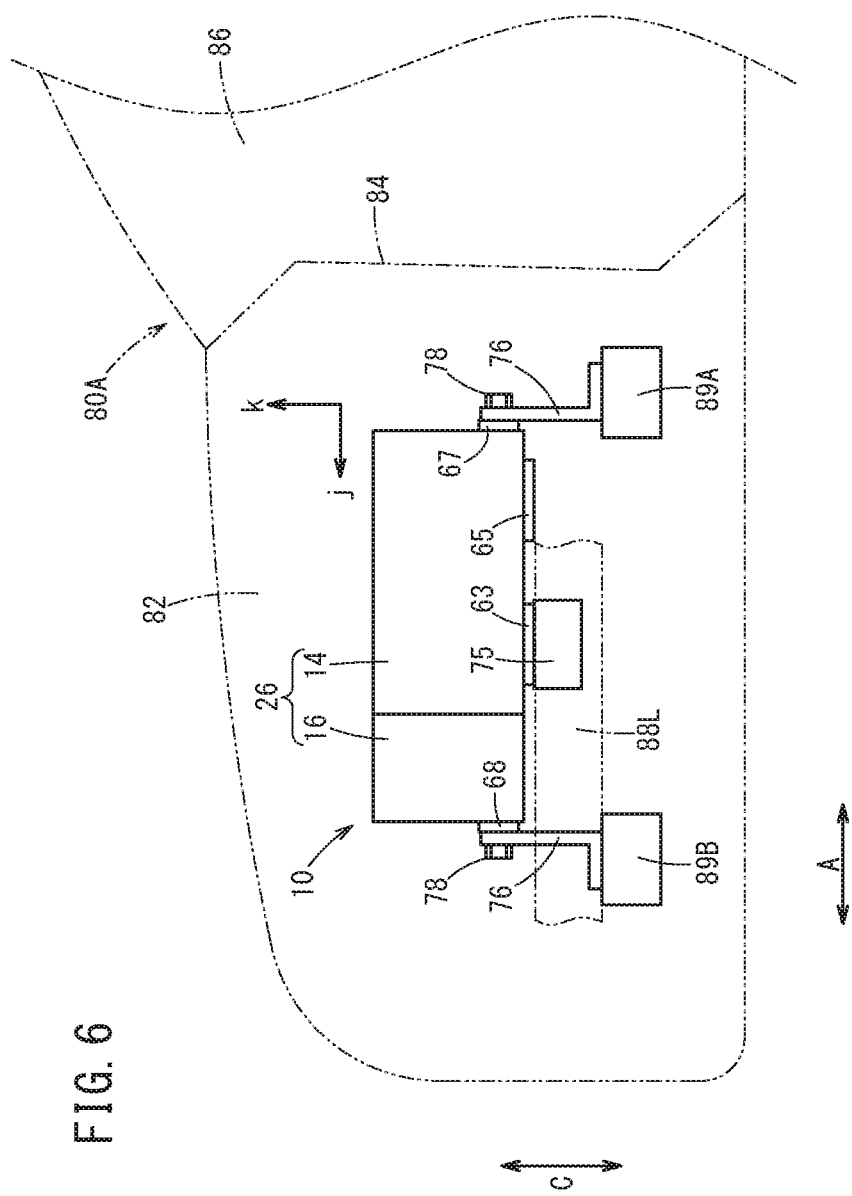
FIG. 6 is a side view showing a method of mounting the fuel cell module in FIG. 1A in a second fuel cell vehicle.

In the case of a second fuel cell vehicle 80A shown in FIG. 6, the fuel cell module 10 is mounted in the second fuel cell vehicle 80A in a manner that the stacking direction (indicated by the arrow j) of the cell stack body 20as is aligned with the front-rear direction (indicated by the arrow A) of the second fuel cell vehicle 80A. That is, the fuel cell module 10 is placed in a longitudinal direction which is 90 degrees different from the direction (lateral direction) in which the fuel cell module 10 is placed in the first fuel cell vehicle 80.

Figure 7:
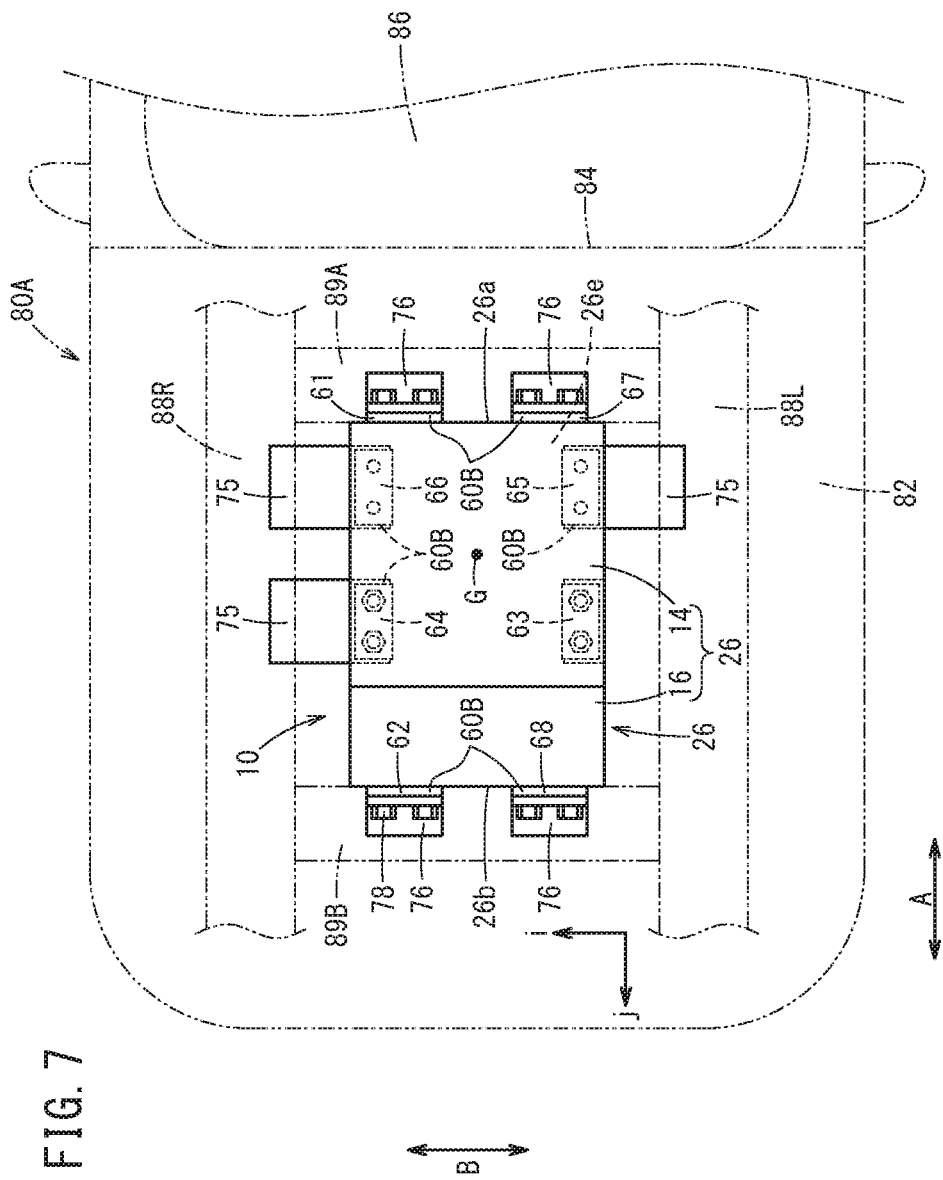
FIG. 7 is a plan view showing the method of mounting the fuel cell module in FIG. 1A in the second fuel cell vehicle.

As shown in FIG. 7, the motor room 82 of the second fuel cell vehicle 80A is provided with a cross member 89A and a cross member 89B in addition to the right side member 88R and the left side member 88L. The cross member 89A and the cross member 89B extend in the vehicle width direction indicated by the arrow B. The cross member 89A and the cross member 89B are spaced from each other in the front-rear direction (indicated by the arrow A).

The fuel cell module 10 is fixed to the second fuel cell vehicle 80A by the first connector 61 and the seventh connector 67 formed on the first side surface 26a of the case body 26, the second connector 62 and the eighth connector 68 formed on the second side surface 26b, and the fourth connector 64, the fifth connector 65 and the sixth connector 66 formed on the bottom surface 26e. The first connector 61 and the seventh connector 67 are fixed to the cross member 89A through the brackets 76 joined by bolts 78, respectively. Further, the second connector 62 and the eighth connector 68 are fixed to the cross member 89B through the brackets 76 joined by bolts, respectively. Further, the fifth connector 65 is fixed to the left side member 88L through a bracket 75, and the fourth connector 64 and the sixth connector 66 are connected to the right side member 88R through brackets 75.

As described above, a second connector group 60B is made up of the first connector 61, the second connector 62, the fourth connector 64, the fifth connector 65, the sixth connector 66, the seventh connector 67, and the eighth connector 68. Of these connectors, the first connector 61 and the second connector 62 also belong to the first connector group 60A. That is, the first connector 61 and the second connector 62 are common connectors which belong to both of the first connector group 60A and the second connector group 60B.

Also in the second fuel cell vehicle 80A, the fuel cell module 10 is fixed to the side members 88R, 88L and the cross members 89A, 89B by a plurality of connectors that are arranged so as to surround the gravity center G.

The fuel cell module 10 and the method of mounting the fuel cell module 10 offer the following advantages.

The fuel cell module 10 includes the plurality of connectors 61 to 68 on the case body 26 containing the cell stack body 20as, for mounting the fuel cell module 10 into the fuel cell vehicle 80, 80A. The connectors 61 to 68 include the first connector group 60A configured to be used for mounting the fuel cell module 10 into the first fuel cell vehicle 80 in a manner that the stacking direction (indicated by the arrow j) of the cell stack body 20as of the fuel cell module 10 is aligned with the vehicle width direction indicated by the arrow B), and the second connector group 60B configured to be used for mounting the fuel cell module 10 into the second fuel cell vehicle 80A in a manner that the stacking direction (indicated by the arrow j) of the cell stack body 20as of the fuel cell module 10 is aligned with the front-vehicle direction of the second fuel cell vehicle 80A in (indicated by the arrow A). Further, some of the connectors are common to both the first connector group 60A and the second connector group 60B. Therefore, it is possible to reduce the number of the connectors provided on the case body 26. By reducing the number of the reinforced portions of the case body 26, it is possible to suppress increase in the size and the weight of the case body 26.

In the fuel cell module 10, the case body 26 has a substantially rectangular parallelepiped shape including the first side surface 26a and the second side surface 26b perpendicular to the stacking direction (indicated by the arrow j) of the cell stack body 20as, the third side surface 26c and the fourth side surface 26d in parallel with the stacking direction (indicated by the arrow j) of the cell stack body 20as, and the bottom surface 26e and the upper surface 26f perpendicular to the first to fourth side surfaces 26a to 26d. Further, the connectors 61, 62 that are common to both the first connector group 60A and the second connector group 60B may be formed on at least one or both of the first side surface 26a and the second side surface 26b. In the structure, it is possible to use, in common, connectors that are always used for fixing the fuel cell module 10 to the side members (88R, 88L) and the cross members (89, 89A, 89B), at the time of mounting the fuel cell module 10 into the first fuel cell vehicle 80 or the second fuel cell vehicle 80A.

In the fuel cell module 10, the connectors 61, 62 formed on the first side surface 26a and the second side surface 26b may be fixed respectively to the left and right side members 88R, 88L in the first fuel cell vehicle 80, and in the second fuel cell vehicle 80A, the connectors 61, 62 may be fixed to the cross members 89A, 89B extending in the vehicle width direction (indicated by the arrow B). In this case, the connectors can be used in common (i.e., as common connectors), and the number of the reinforced portions of the case body 26 can be reduced. Accordingly, it is possible to suppress the increase in the size and weight of the case body 26.

In the fuel cell module 10, the case body 26 may include the stack case 14 containing the cell stack body 20as, and the auxiliary device case 16 joined to the stack case 14 and containing the fuel cell auxiliary devices. The first side surface 26a may be formed on the stack case 14, and the second side surface 26b may be formed on the auxiliary device case 16. By using, as common connectors, the connectors 61, 62 on the two side surfaces 26a, 26b which are relatively remote from the gravity center G of the fuel cell module 10, it is possible to effectively suppress increase in the weight of the case body 26.

In the fuel cell module 10, the first connector group 60A includes the first connector 61 formed on the first side surface 26a, the second connector 62 formed on the second side surface 26b, and the third connector 63 formed on any of the third side surface 26c, the fourth side surface 26d, and the bottom surface 26e. The second connector group 60B includes the first connector 61 formed on the first side surface 26a, the second connector 62 formed on the second side surface 26b, and the fourth connector 64 formed on any of the third side surface 26c, the fourth side surface 26d, and the bottom surface 26e. By using, as common connectors, the connectors 61, 62 on the first and second side surfaces 26a, 26b which are relatively remote from the gravity center G of the fuel cell module 10, it is possible to effectively suppress increase in the weight of the case body 26.

In the fuel cell module 10, the connectors belonging to the first connector group or the connectors belonging to the second connector group (each of the first connector group 60A and the second connector group 60B) includes at least three connectors, and the three connectors are provided at positions surrounding the gravity center position of the fuel cell module 10. Owing thereto, it is possible to reliably fix the fuel cell module 10 to the fuel cell vehicle 80, 80A.

In the method of mounting the fuel cell module 10, connectors that are common to both the first connector group 60A for mounting the fuel cell module 10 into the first fuel cell vehicle 80 and the second connector group 60B for mounting the fuel cell module 10 into the second fuel cell vehicle 80B are used as common connectors. In the structure, it is possible to reduce the number of connectors provided on the case body 26. Further, by reducing the number of the reinforced portions of the case body 26, it is possible to suppress increase in the size and the weight of the case body 26.

In the method of mounting the fuel cell module 10, the connectors 61, 62 configured to be fixed to the side members 88R, 88L of the first fuel cell vehicle 80, among the connectors which belong to the first connector group 60A, may be used for mounting the fuel cell module 10 into the second fuel cell vehicle 80A. By using, in common, the two connectors 61, 62 which are relatively remote from the gravity center G of the fuel cell module 10, it is possible to effectively suppress increase in the weight of the case body 26.

Although the preferred embodiments of the present invention have been described, the present invention is not limited to these embodiments. It is a matter of course that various modifications may be made without departing from the gist of the present invention.

What is claimed is:

1. A fuel cell module comprising:
a cell stack body including a plurality of power generation cells stacked together, and a case body containing the cell stack body, wherein
the case body comprises a stack case containing the cell stack body, an auxiliary device case joined to the stack case and containing a fuel cell auxiliary device, and a plurality of connectors configured to mount the case body into a fuel cell vehicle,
the case body has a substantially rectangular parallelepiped shape including a first side surface defined by a side panel of the stack case and perpendicular to the stacking direction of the cell stack body, a second side surface defined by the auxiliary device case and perpendicular to the stacking direction of the cell stack body, a third side surface and a fourth side surface defined by surfaces of the stack case and the auxiliary device case that are parallel to the stacking direction of the cell stack body, and a bottom surface and an upper surface defined by surfaces of the stack case and the auxiliary device case that are parallel to the stacking direction of the cell stack body; and
the plurality of connectors comprise:
a first connector and a seventh connector formed on the first side surface of the case body and aligned with each other in a direction perpendicular to the third side surface with a space therebetween,
a second connector and an eighth connector formed on the second side surface of the auxiliary device case and aligned with each other in the direction perpendicular to the third side surface with a space therebetween, and
a third connect, a fourth connector, a fifth connector, and a sixth connector formed on the bottom surface of the stack case, the third connector and the fifth connector being arranged side by side along a long side of the bottom surface adjacent to the third side surface, and the fourth connector and the sixth connector being arranged side by side along the long side,
wherein at least two of the first to eighth connectors form a first connector group configured to be used for mounting the fuel cell module into a first fuel cell vehicle in a manner that a stacking direction of the cell stack body is aligned with a vehicle width direction as a first direction,
wherein at least two of the first to eighth connectors form a second connector group configured to be used for mounting the fuel cell module into a second fuel cell vehicle in a manner that the stacking direction of the cell stack body is aligned with a vehicle front-rear direction as a second direction, and
wherein at least one of the first to eighth connectors is included in both the first connector group and the second connector group.

2. The fuel cell module according to claim 1, wherein, in the first fuel cell vehicle, the first, second, seventh and eighth connectors formed on the first side surface and the second side surface are fixed respectively to left and right side members, and in the second fuel cell vehicle, the connectors formed on the first side surface and the second side surface are fixed to respective cross members extending in the vehicle width direction.

3. The fuel cell module according to claim 1, wherein each of the first connector group and the second connector group includes at least three of the first to eighth connectors, and the at least three connectors are provided at positions surrounding a gravity center position of the fuel cell module.

4. The fuel cell module according to claim 1, wherein at least one of the first, second, seventh and eighth connectors formed on the first side surface and the second side surface is included in both the first connector group and the second connector group.

* * * * *